United States Patent [19]

Asada et al.

[11] Patent Number: 5,029,687
[45] Date of Patent: Jul. 9, 1991

[54] SELF ADJUSTER FOR PULL-TYPE CLUTCH

[75] Inventors: Masaaki Asada; Hiromi Tojima, both of Neyagawa, Japan

[73] Assignee: Kabushiki Kaisha Daikin Seisakusho, Osaka, Japan

[21] Appl. No.: 466,529

[22] Filed: Jan. 17, 1990

[30] Foreign Application Priority Data

Jan. 18, 1989 [JP] Japan .................................. 1-4594[U]
Jan. 18, 1989 [JP] Japan .................................. 1-4595[U]

[51] Int. Cl.⁵ .............................................. F16D 13/75
[52] U.S. Cl. .................................. 192/111 A; 192/70.25
[58] Field of Search ................ 192/70.25, 70.3, 111 A

[56] References Cited

U.S. PATENT DOCUMENTS

| | | | |
|---|---|---|---|
| 2,077,709 | 4/1937 | Pearmain | 192/70.25 |
| 3,752,286 | 8/1973 | Sink | 192/111 A |
| 4,157,749 | 6/1979 | Sink et al. | 192/99 A |
| 4,720,002 | 1/1988 | Kitano et al. | 192/70.25 |
| 4,754,860 | 7/1988 | Fukutake et al. | 192/70.25 |
| 4,760,906 | 8/1988 | Flowtow et al. | 192/70.25 |
| 4,848,550 | 7/1989 | Kitano et al. | 192/99 A |
| 4,856,634 | 8/1989 | Kitano et al. | 192/70.3 |
| 4,890,708 | 1/1990 | Kitano et al. | 192/70.3 |
| 4,895,235 | 1/1990 | Nihimura et al. | 192/70.3 |

Primary Examiner—Allan D. Herrmann
Assistant Examiner—Nicholas Whitelaw
Attorney, Agent, or Firm—Armstrong, Nikaido, Marmelstein, Kubovcik & Murray

[57] ABSTRACT

A pull-type clutch including a pressing force transmission lever, an inner peripheral end of which is in contact with a retainer connected to a release bearing, and an approximately annular adjusting ring for adjusting clearances produced by wear of the clutch facing and which is in contact with a radial outside end of the lever and screwed into an inner peripheral surface of the clutch cover. An adjuster is provided on an inner surface side of the adjusting ring and causes the adjusting ring to rotate by means of rotation of the adjuster so that the adjusting ring can move axially toward a pressure side. A rotation drive is provided which is driven by the retainer moved in the clutch axial direction by clutch engaging and releasing operations, when the clutch facings are worn, so as to adjust the adjuster.

2 Claims, 9 Drawing Sheets

SELF ADJUSTER FOR PULL-TYPE CLUTCH

BACKGROUND OF THE INVENTION

(Industrial useful field)

This invention relates to a so-called pull-type clutch which pulls a release bearing toward a transmission side to carry out releasing action by using a release lever connected to a clutch pedal, and particularly to a self adjuster which is automatically adjustable according to a wear of a facing.

(Prior art and its problem)

Concerning this kind of pull-type clutch, the applicant of this invention has already applied Japanese Patent Application No, 61-142140 for a patent.

Figure 10:
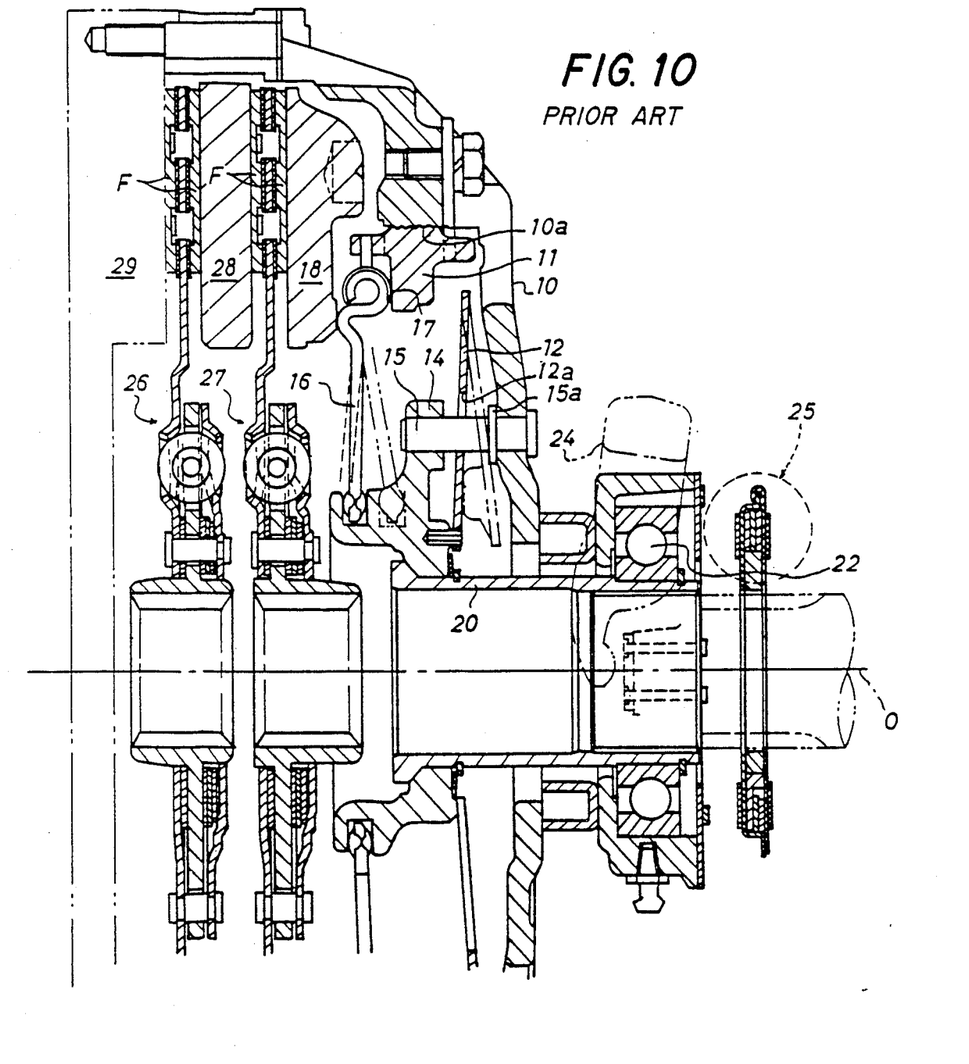
FIG. 10 is a schematic structural view showing a conventional self adjuster.

In this prior art; a diaphragm spring 12, a retainer 14, a lever 16 (pressing force transmission lever) and a pressure plate 18 are installed in a clutch cover 10 as illustrated by FIG. 10, so that the releasing action is carried out by a release lever 24 through a sleeve 20 connected to the retainer 14 and a release bearing 22. The retainer 14 is locked by a pin 15, and the pin 15 is in turn fixed to the clutch cover 10 at a flange 15a.

In the prior art arrangement of FIG. 10; 17 is an outside fulcrum point of the lever 16, 25 is an inertial brake, 26 and 27 are clutch discs, 28 is an intermediate plate, and 29 is an engine flywheel.

Lever 16 is installed between the retainer 14 and an adjusting ring 11 screwed into the clutch cover 10 so that an adjusting work becomes very troublesome when facings F of the clutch discs 26 and 27 are worn out, because a screwed part 10a of the adjusting ring must be turned relatively to the clutch cover 10 in order to adjust a position of the adjusting ring 11 in clutch axial direction.

On the other hand, concerning the automatic adjusting device for clutch, Published Patent Application (KOKAI) No. 60-143228 corresponding to U.S. Pat. No. 4,549,643 has been known. This device comprises a first boss member having worm screws on its outer peripheral surface, a second boss member having a pin, and first and second coil springs connecting the both boss members together etc. However, in this device automatic adjustment can not be done smoothly because the both boss members are elastically connected by spring forces of the first and second coil springs.

SUMMARY OF THE INVENTION

An object of this invention is to provide a clutch, in a so-called pull-type clutch, which allows automatic position adjustment of an adjusting ring when a clutch disc is worn out and further enables smooth automatic adjustment of it.

In a clutch pulling a release bearing apart from a flywheel to carry out releasing action by using a release lever connected to a clutch pedal; the present invention provides a self adjuster for pull-type clutch including a pressing force transmission lever an inner peripheral end of which is in contact with a retainer connected to the release bearing, an approximately annular adjusting ring for adjusting clearances produced by wear of facings, which is in contact with a radial outside end of the lever and screwed into an inner peripheral surface of a clutch cover, a rotation means provided on an inner surface side of the adjusting ring, which causes the adjusting ring to rotate by means of rotation of the rotation means so that the adjusting ring can move axially toward a pressure plate side, and a rotation drive means driven by the retainer moved in the clutch axial direction by means of clutch engaging/releasing operations when the facings are worn out, so as to drive the foregoing rotation means.

In the self adjuster of the present invention, the rotation drive means is rotated by the retainer when the facings are worn out. Thereby, the rotation means is rotated to cause the adjusting ring to rotate so that a position of the adjusting ring is adjusted automatically by an amount of wear of the facings.

DETAILED DESCRIPTION OF THE INVENTION

(First embodiment)

Figure 1:
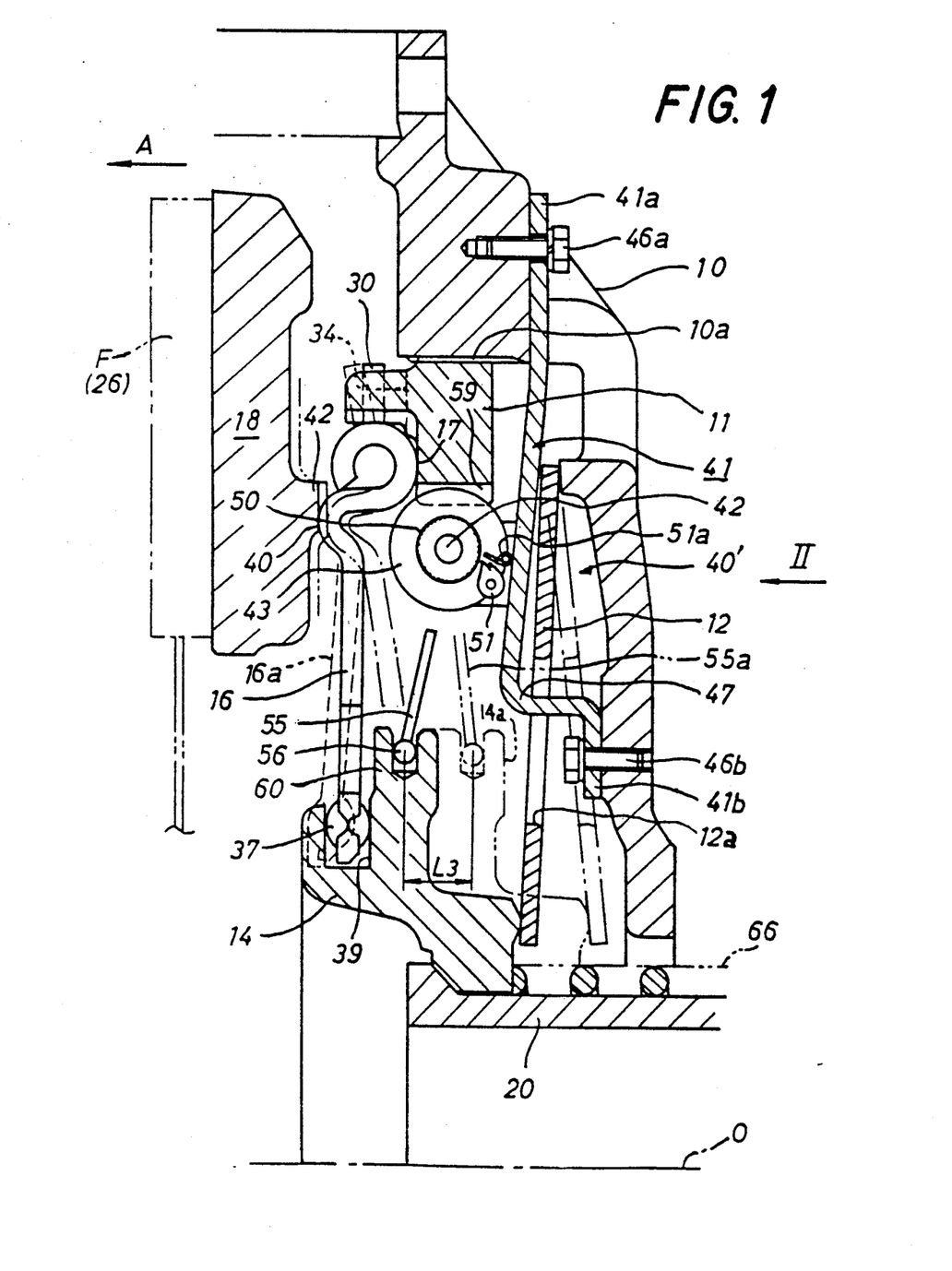
FIG. 1 is a vertical sectional view showing a first embodiment of the present invention.

In FIG. 1 showing the vertical sectional view of clutch, components attached with symbols same as those described in the prior art are components corresponding thereto, and only different points will be described hereunder.

In FIG. 1 showing only an upper half section above a center line 0, the approximately annular adjusting ring 11 fits onto a projection 30 (at outer peripheral end) of the lever 16. The projection 30 is inserted in a groove 34 of the adjusting ring 11, and the adjusting ring 11 is threaded in the clutch cover 10 at the threaded part 10a so that its axial position can be adjusted arbitrarily.

An intermediate fulcrum point 40 of the lever 16 is always pressed on a fulcrum land 42 of the pressure plate 18 by a spring force of the diaphragm spring 12. A spherical inside fulcrum point 37 is formed on an inner peripheral side end of the lever 16, and the inside fulcrum point 37 fits in an annular groove 39 of the retainer 14. The adjusting ring 11 is so designed as to move forward together with the lever 16 as the lever 16 moves forward when the facings F of the clutch discs 26 and 27 are worn out, as described later in details.

The self adjuster 40' which is an essential part of this invention will be described hereunder. The self adjuster 40' is made of a stay bracket 41, a pin 42, a worm wheel 43 (FIG. 2), a free rotor 44 and an arm rotor 45 etc. The stay bracket 41 is made of an approximately band-like steel plate, its outer peripheral end 41a is fastened by a bolt 46a to the clutch cover 10, and its inner peripheral end 41b is fastened by a bolt 46b to the clutch cover 10. The stay bracket 41 passes through an opening 12a of the diaphragm spring 12 at a bent portion 47 near to the inner peripheral end 41b. Two bearing pieces 48a and 48b are formed integrally with the stay bracket 41 by bending work in the vicinity of an inner peripheral surface of the adjusting ring 11 with a prescribed distance left therebetween in clutch circumferential direction. The foregoing pin 42 is supported by the bearing pieces 48a and 48b, and the worm wheel 43 and the free rotor 44 are carried by the pin 42.

The above worm wheel 43, the free rotor 44 and the arm rotor 45 etc. will be described by referring to FIG. 3 which is the schematic oblique exploded view of the self adjuster 40'. Since FIG. 3 is the schematic view after all, FIG. 1 and FIG. 2 take precedence over FIG. 3 in the event when detailed shapes etc. of components are different from those of FIG. 1 and FIG. 2.

Figure 3:
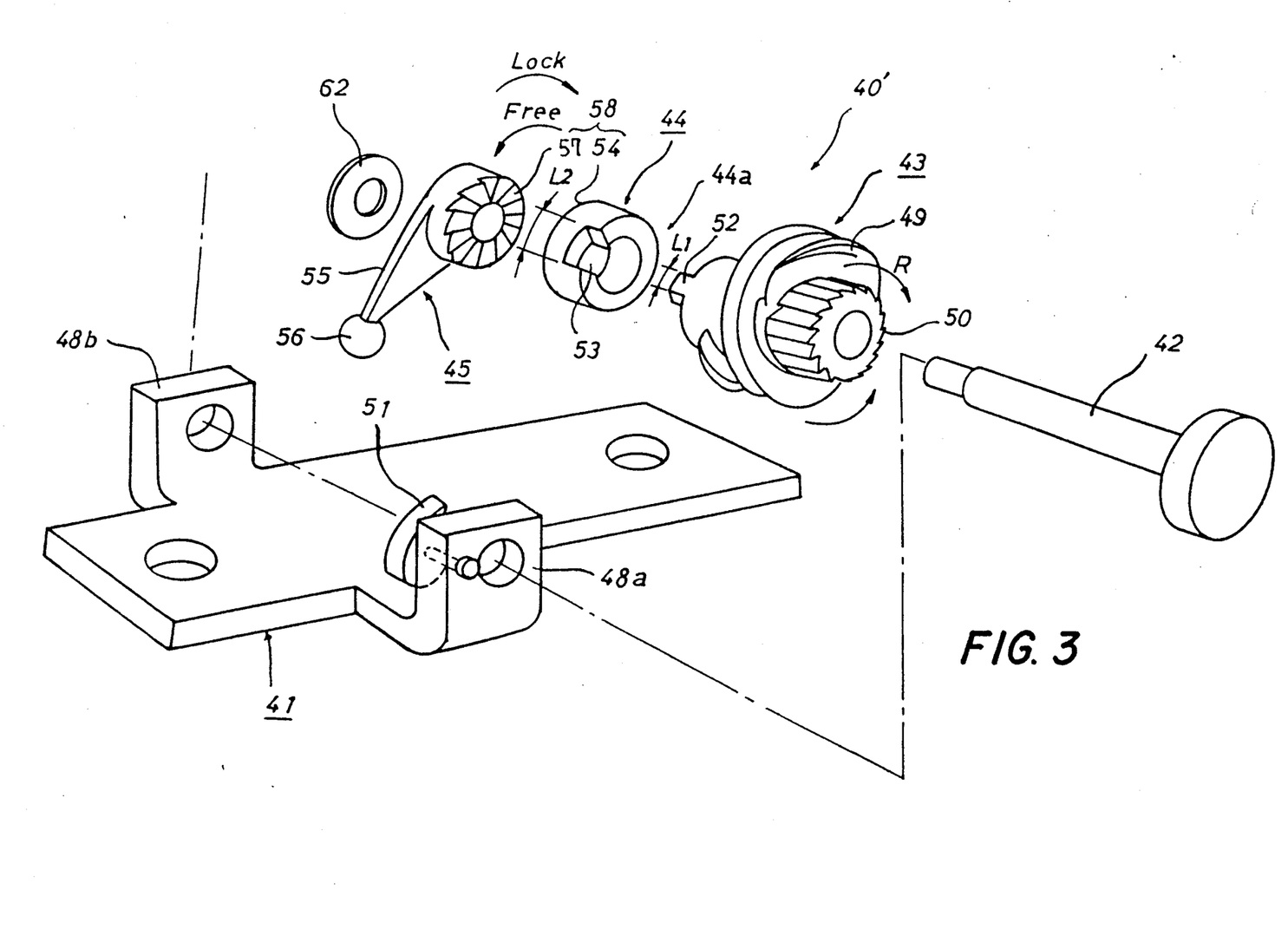
FIG. 3 is a schematic oblique exploded view of a self adjuster of the first embodiment.
Figure 4:
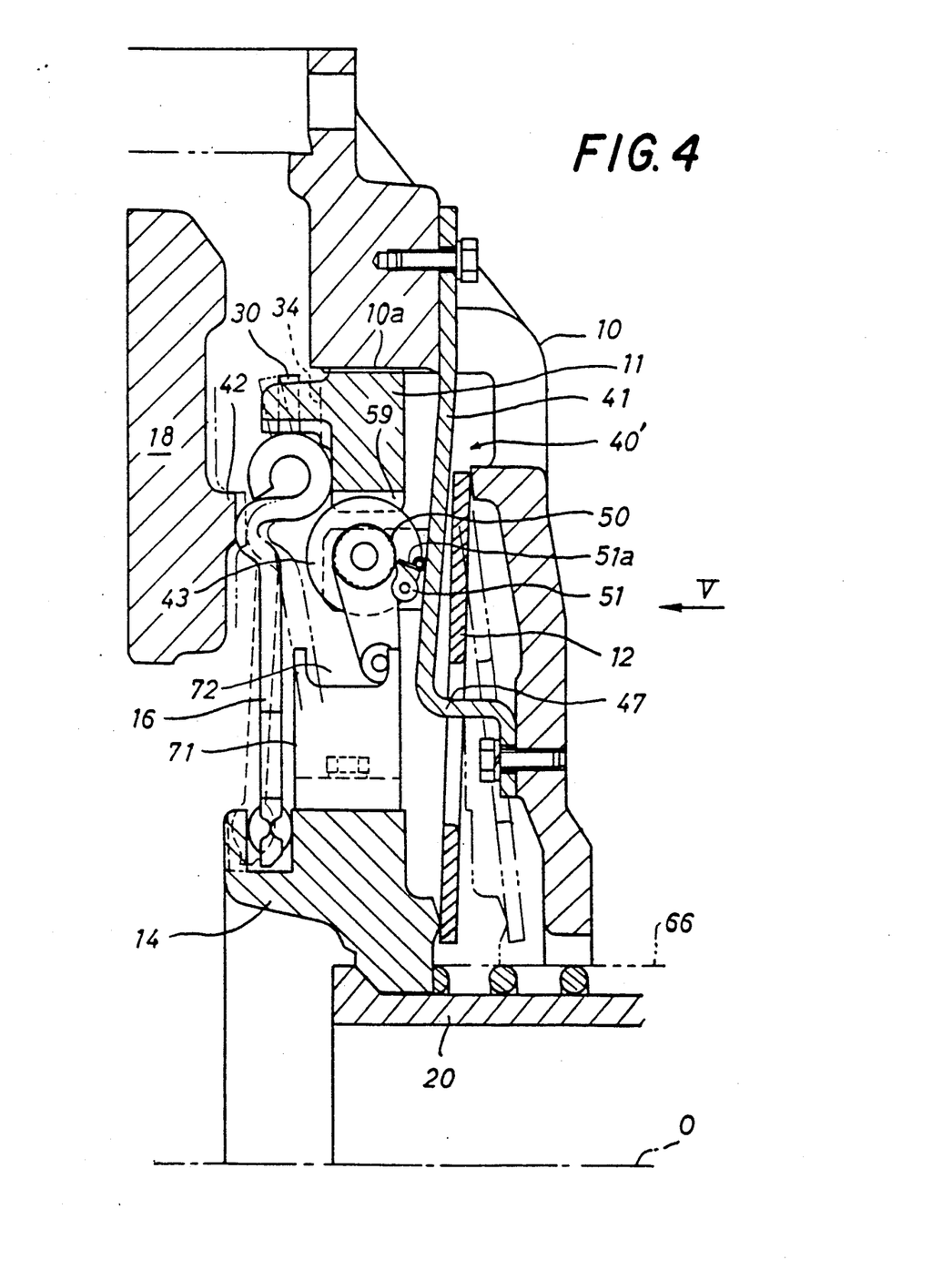
FIG. 4 is a vertical sectional view showing an alternate structure of the first embodiment.
Figure 5:
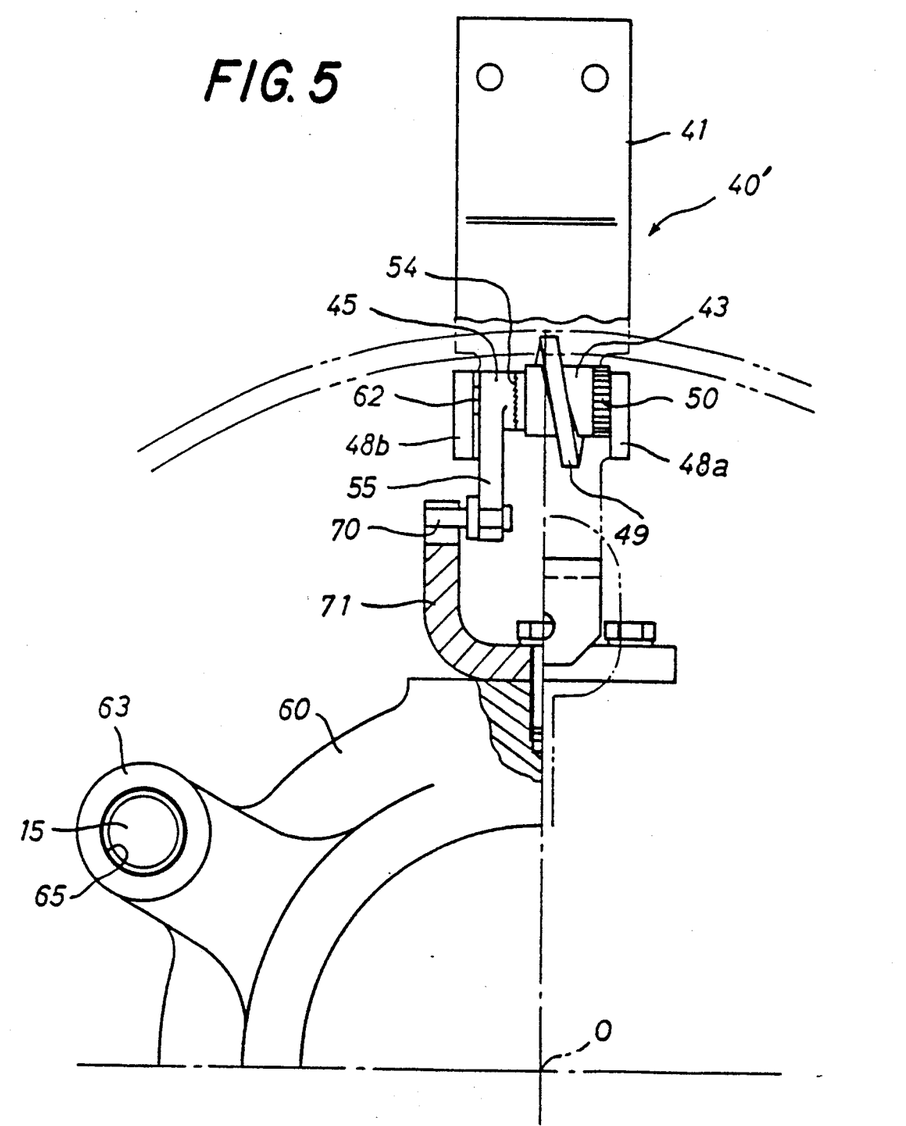
FIG. 5 is a view viewed in a direction of arrow V of FIG. 4.

In FIG. 3, the worm wheel 43 fits rotatably onto the pin 42 and is located near to the bearing piece 48a between the two bearing pieces 48a and 48b. A worm screw 49 is formed on a central outer peripheral surface of the worm wheel 43. Ratchet external teeth 50 are formed on a right end of the worm wheel 43 in the figure. The ratchet external teeth 50 mate with a stopper 51 of the bearing piece 48a to permit the worm wheel 43 to rotate only in a direction of arrow R, and prevents the worm wheel 43 from rotating in a direction opposite to the arrow R. The stopper 51 is urged by a torsion spring 51a so that its tip end may mate with the ratchet external teeth 50. At a left end of the worm wheel 43, an approximately arc-like projection 52 is formed on its outer peripheral portion. A width L1 of the projection 52 is made comparatively small.

At left side of the worm wheel 43, the approximately cylindrical free rotor 44 fits rotatably onto the pin 42. A notch 53, in which the projection 52 of the worm wheel 43 fits, is formed on a right end face of the free rotor 44. A width L2 of the notch 53 is made large so as to satisfy the following equation.

$$L2 - L1 = \delta \quad (1)$$

Further, the play δ is so determined as to absorb a rotation of the arm rotor 45 accompanied by the engaging-/releasing operations under a normal state where the facings F have not been worn out yet. These free rotor 44 and projection 52 compose a play creating mechanism 44a. Incidentally, the projection 52 and the notch 53 are not limited to the above case where they are formed on only one spot, but may be formed on plural spots.

A ratchet tooth surface 54 is formed on a left end face (worm wheel side pressing end face) of the free rotor 44 in the figure. On a left side of the free rotor 44, the arm rotor 45 which rotates with the movement of the foregoing retainer 14 fits rotatably onto the pin 42. An arm 55 extending in a radial external direction relatively to the pin 42 is formed on the arm rotor 45, and a spherical body 56 is formed at tip end of the arm 55. The spherical body 56 fits in a recessed part 61 formed on a flange 60 (FIG. 1 and FIG. 2) of the retainer 14 so as to rotate the rotor arm 45 with the movement of the retainer 14.

A ratchet tooth surface 57 mating with the ratchet tooth surface 54 of the free rotor 44 is formed on a right end face (pressing end face) of the arm rotor 45, and the ratchet tooth surfaces 54 and 57 compose a ratchet mating part 58. The ratchet mating part 58 is so formed as to be integrally engaged when the arm rotor 45 swings in the direction of arrow R, and to slide when the arm rotor 45 swings in the direction opposite to the arrow R.

A coned disc spring 62 (spring member) is compressively installed between a left end face of the arm rotor 45 and the bearing piece 48b, so that a spring force of the coned disc spring 62 urges the arm rotor 45 toward the worm wheel 43. A coil spring etc. may be used in place of the coned disc spring 62.

The above-mentioned components ranging from the worm wheel 43 to the coned disc spring 62 are installed between the bearing pieces 48a and 48b, and an end of the pin 42 is fastened by caulking work or using a nut.

In FIG. 1, a rack 59 (FIG. 2) mating with the worm screw 49 of the worm wheel 43 is formed on an inner peripheral surface of the adjusting ring 11 over its entire circumference, so that the adjusting ring 11 is rotated by the rotation of the worm wheel 43 and its position is adjusted in the axial direction.

Figure 2:
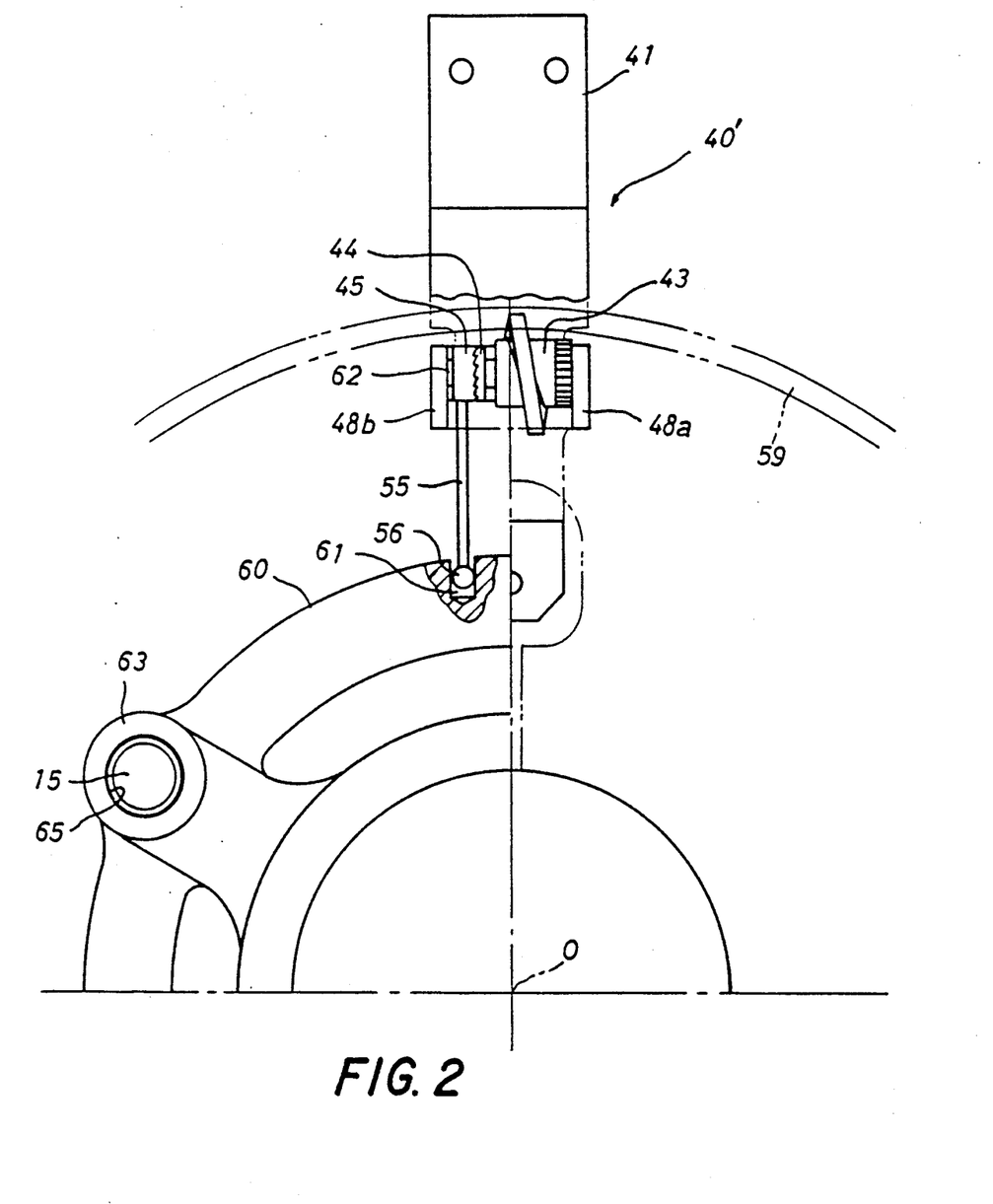
FIG. 2 is a view viewed in a direction of arrow II of FIG. 1.

The above-mentioned flange 60 extends into an approximately annular shape, from an axial intermediate outer peripheral portion of the retainer 14 to a radial outside and over the entire circumference. As shown by FIG. 2, bosses 63 are formed on circumferential three places of the flange 60, and pins 15 (FIG. 6) for locking the retainer 14 fit in the bosses 63 in such a manner as sliding freely in the axial direction (normal to sheet surface of FIG. 2). The pin 15 fits in a hole 65 of the boss 63 at its tip portion, passes through a passing hole 12a (FIG. 1) of the diaphragm spring 12 at its central portion, and is secured to the clutch cover 10 at its base portion.

The retainer 14 is installed on a sleeve 20 in a manner as sliding freely in the axial direction while being urged by a coil spring 66 toward left side of the figure.

Function will described hereunder. In FIG. 1, a spring force of the diaphragm spring 12 pushes the retainer 14 in a direction of arrow A under a clutch engaging state as illustrated by solid lines, and this spring force transmits to the pressure plate 18 in the direction of arrow A to press on the clutch discs 26 and 27 (FIG. 6) while being multiplied by the lever 16.

In a clutch releasing state where the release lever 24 (FIG. 10) is moved through the release bearing 22 to pull the sleeve 20 in the direction opposite to the arrow A, the retainer 14 is moved by an amount of L3 up to a position shown by a symbol 14a as illustrated by two-dot-chain lines of FIG. 1. In this instance, the arm 55 of the arm rotor 45 also swings up to a position shown by a symbol 55a in the direction of arrow R of FIG. 3. Within a swinging angle range of the arm rotor 45 up to a symbol 55a, the swing of the arm rotor 45 is absorbed by the play δ between the projection 2 and the notch 53 even if the arm rotor 45 swings integrally with the free rotor 44, so that the worm wheel 3 does not rotate. Accordingly, the clutch engaging/releasing operations are carried out in the same manner as ordinary operation when the facings F have not been worn out yet.

After the facings F have been worn out, the lever 6 moves together with the pressure plate 18 by an amount of wear up to a position of broken lines shown by a symbol 16a of FIG. 1 in the direction of arrow A. Under this worn out state, the adjusting ring 11 is also required to move in the direction of arrow A, and the position of the adjuster ring 11 is automatically adjusted by the self adjuster 40' as described below.

Assuming that a wear amount of the facings F is $\alpha$, the retainer 14 will finally move in the direction of arrow A by about a distance $\alpha$ so that a pulling distance of the retainer 14 in the releasing state will become about a value given by the following equation.

$$L3 + \alpha \quad (2)$$

In this instance, the worm wheel 43 will finally rotate by about an angle corresponding to the distance $\alpha$ beyond the play $\delta$ between the projection 52 and the notch 53 in the direction of arrow R of FIG. 3, so that the releasing operation causes the worm wheel 43 to rotate by the angle corresponding to the distance $\alpha$ in the direction of arrow R. When the worm wheel 43 rotates, the rack 59 of the adjusting ring 11 is rotated by the worm screw 49 and the adjusting ring 11 is moved by means of a screw pitch of the threaded part 10a in the direction of arrow A. Consequently, the adjusting ring 11 moves in the direction of arrow A so that its position is adjusted automatically by repeating the clutch engaging/releasing operations until relative positions between the adjusting ring 11, the lever 16 and the pressure plate 18 etc. are restored to initial positions where the facings F are not worn out.

As described above, the self adjuster for so-called pull-type clutch includes the pressing force transmission lever 16 the inner peripheral end of which is in contact with the retainer 14 connected to the release bearing 22, and the approximately annular adjusting ring 11 for adjusting the clearance produced by the wear of facings, which is in contact with the radial outside end of the lever 16 and screwed into the inner peripheral surface of the clutch cover 10. The swing motion of the arm rotor 45 which is swung by the retainer 14 moved in the clutch axial direction when the facings F are worn out, can be transmitted to the worm wheel 43 through the ratchet mechanism 58. The rack 59 is rotated by the worm screw 49 of the worm wheel 43 so that the position of the adjusting ring 11 can be adjusted automatically by the amount of wear of the facings F in the direction of the arrow A.

The ratchet mechanism 58 can transmit only the swing motion in the direction of arrow R of the arm rotor 45 to the worm wheel 43 side, so that the automatic adjustment becomes smooth as compared with the conventional adjuster which carries out the automatic adjustment through the spring member.

Reverse rotation of the worm wheel 43 can be prevented by the ratchet tooth surface 50 and the stopper 51, so that there is no possibility for the adjusting ring 11 to move in the direction opposite to arrow A.

Incidentally, the self adjuster 40' is not limited to the above case where it is installed on only one spot in the entire clutch as illustrated by FIG. 1 and FIG. 2, but may be installed on plural spots.

Further, the structure of the self adjuster 40' is not limited to the case of FIG. 3, but may be that in which the worm wheel 43 is made mate directly with the arm rotor 45 and the play creating mechanism is composed of a roller 70 located at tip end of the arm 55 and notch 72 of a bracket 71 fixed to the retainer 14. Since the free rotor 44 of FIG. 3 is eliminated in this case, the ratchet tooth surface 54 is formed directly on an end face of the worm wheel 43.

(Embodiment 2)

Figure 6:
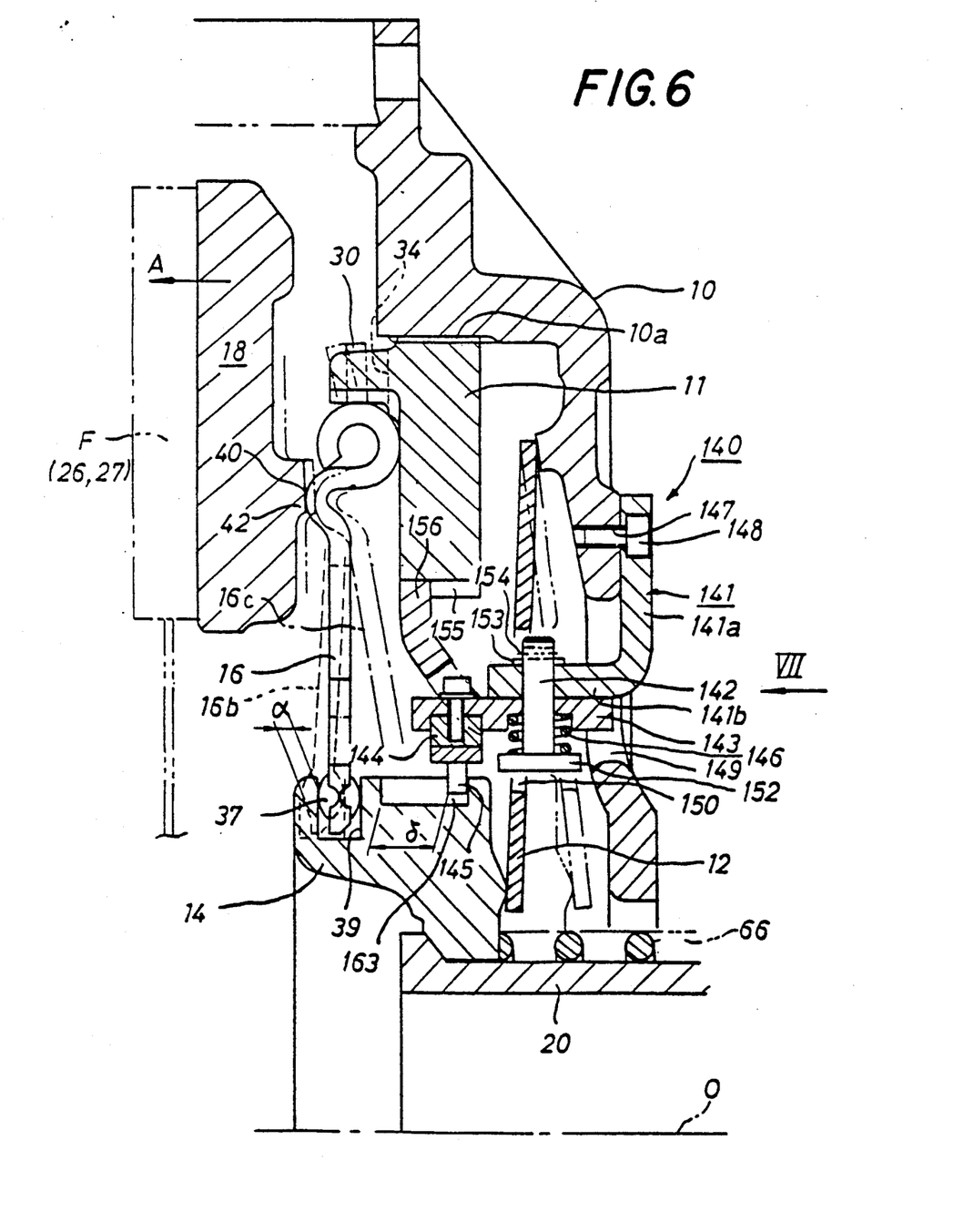
FIG. 6 is a vertical sectional view showing a second embodiment of the present invention.

In FIG. 6 showing the vertical sectional view of clutch, components attached with symbols same as those described in the prior art and the embodiment 1 are components corresponding thereto, and only different points will be described hereunder. The lever 16 and the diaphragm spring 12 etc. are provided in this case in the same manner as the embodiment 1.

A self adjuster 140 which is an essential part of this invention will be described hereunder. The self adjuster 140 comprises a stay bracket 141, a pin 142, a claw lever 143, a sensing arm 144, a sensing pin 145 and a coil spring 146 etc. The stay bracket 141 is a member made of steel plate comprising a holding part 141a and a bearing part 141b, three bolt holes 147 are made on the holding part 141a, and the stay bracket 141 is fastened to the clutch cover 10 by hexagon socket head cap screws 148 passing through the bolt holes 147. The bearing part 141b (FIG. 8) is bent up nearly perpendicularly to the holding part 141a, and extends near to an inner peripheral surface of the adjusting ring 11 in the clutch axial direction through a rectangular hole 149 of the clutch cover 10 and a rectangular hole 150 (FIG. 7) of the diaphragm spring 12. A pin hole 151 (FIG. 9) is made on the bearing part 141b, and the pin 142 fits in the pin hole 151. The pin 142 is locked by an upper washer 153 and a split pin 154 in a position where its head 152 (large dia. portion) is put downward of figure i.e. radial inside of clutch.

The above-mentioned claw lever 143 fits rotatably onto the pin 142, and the coil spring 146 (spring member) urging the claw lever 143 toward a radial outside of clutch is interposed between the claw lever 143 and the head 152. A claw 156, which mates with ratchet internal teeth 155 cut on the inner peripheral surface of the adjusting ring 11, is integrally formed on the claw lever 143.

The pin 142 and the claw lever 143 etc. will be described by referring to FIG. 9 which is the schematic oblique exploded view of the self adjuster 140. Since FIG. 9 is the schematic view after all, FIG. 6 through FIG. 8 take precedence over FIG. 9 in the event when detailed shapes etc. of components are different from those of FIG. 6 through FIG. 8.

Figure 7:
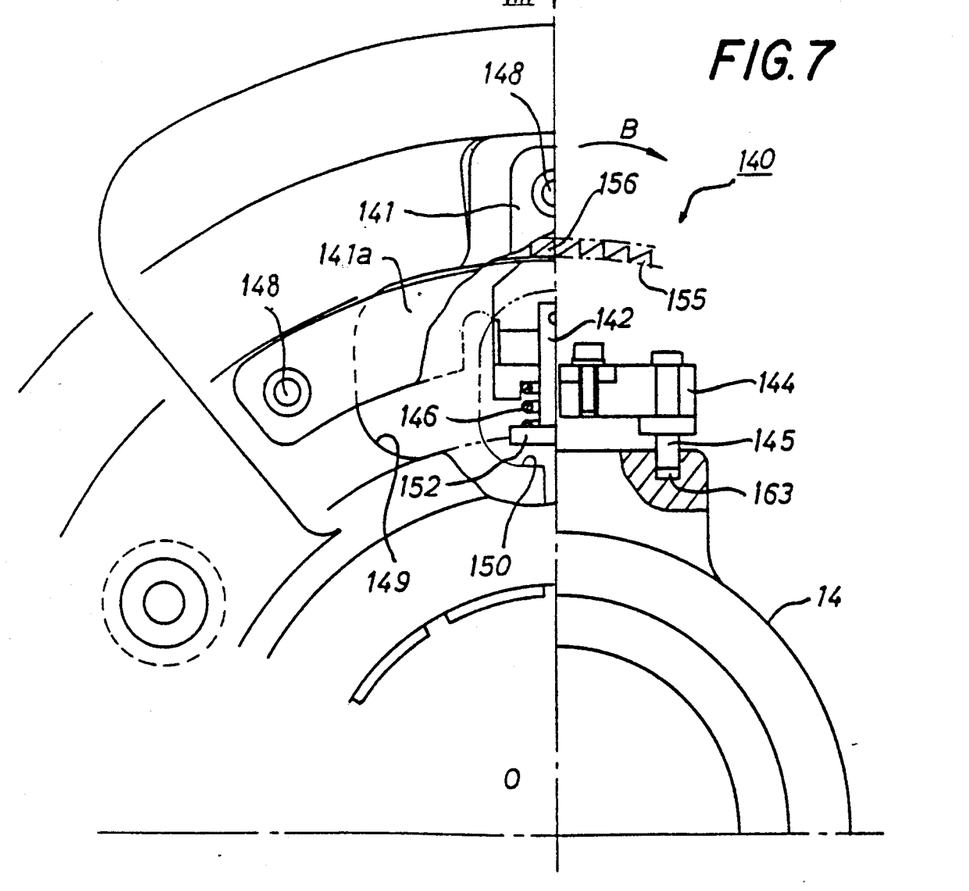
FIG. 7 is a view viewed in a direction of arrow VII of FIG. 6.
Figure 9:
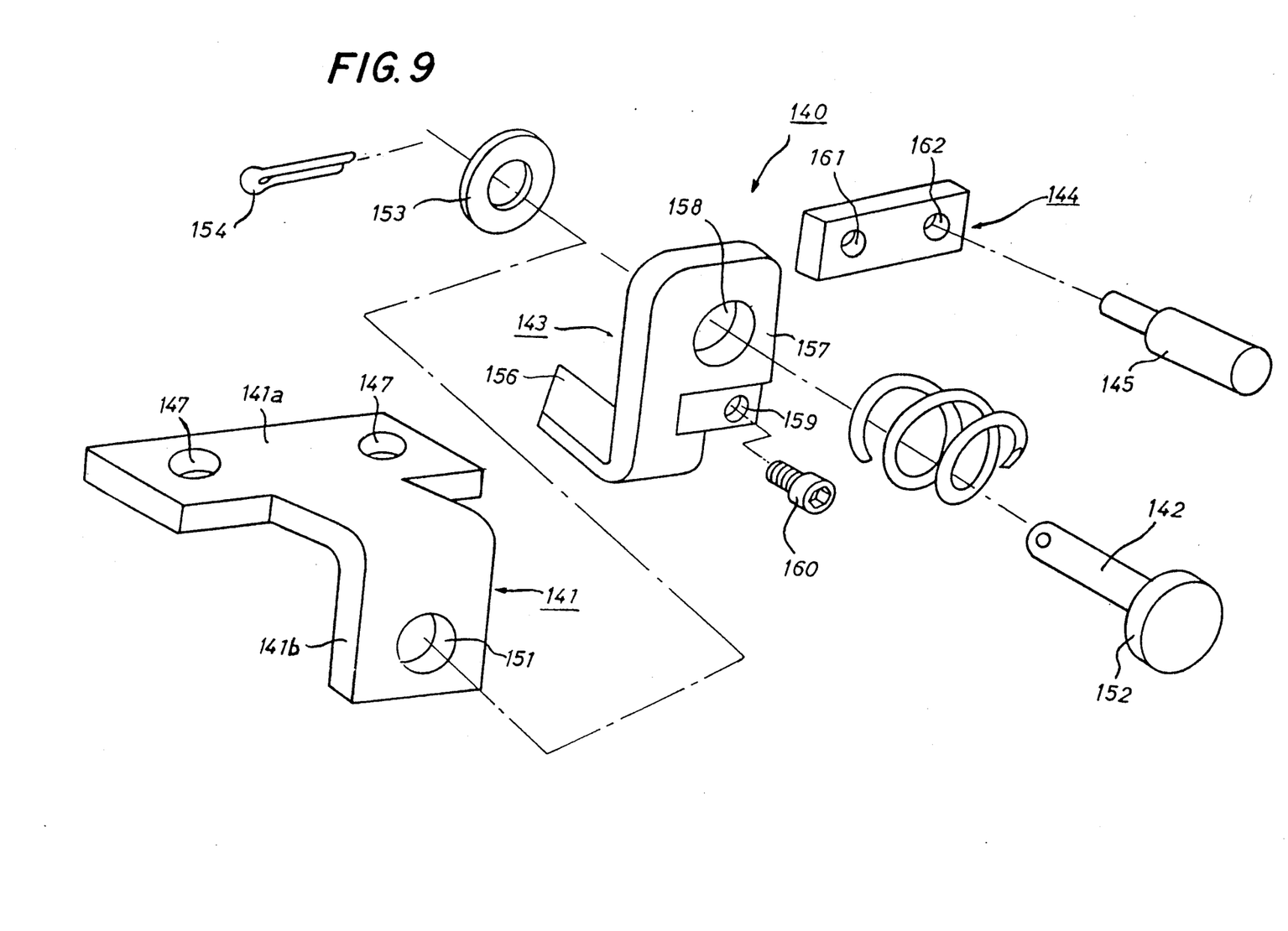
FIG. 9 is a schematic oblique exploded view of a self adjuster of the second embodiment.

In FIG. 9, holes 158 and 159 are made on a body part 157 of the claw lever 143, the pin 142 fits in the hole 158, and the sensing arm 144 is fastened to the hole 159 by a hexagon socket head cap screw 160. The sensing arm 144 is configured in a bar shape having holes 161 and 162 on its longitudinal both ends, tightened using a self-locking nut (not shown) by passing the cap screw 160 through the hole 161, and secured to the claw lever 143 in a position extending in a clutch circumferential direction (FIG. 7). The sensing pin 145 fits in the hole 162, and the sensing pin 145 is secured to the tip end of the sensing arm 144. The sensing pin 145 extends in roughly parallel with the pin 142 in radial inside direction of clutch, and a tip end portion of the sensing pin 145 fits in a groove 163 of FIG. 6 and FIG. 7.

The groove 163 is formed on an outer peripheral surface of the retainer 14 in an approximately arc-like shape along a swinging locus of the sensing pin 145, so that the sensing pin 145 can be swung around the pin 142 as the retainer 14 moves in the axial direction. Further, an axial play $\delta$ is provided in the groove 163 as illustrated by FIG. 6, and this play $\delta$ is so determined as to absorb the movement of the retainer 14 accompanied by the engaging/releasing operations under the normal state where the facings F have not been worn out yet. The shape of the groove 163 is not limited to the foregoing approximately arc-like shape in which the sensing pin 145 fits snugly, but it may be formed into a rectangular shape which extends in the clutch axial direction and permits the sensing pin 145 to swing around the pin 142 with a play left between the sensing pin 145 and the groove in the clutch circumferential direction.

The pin 162, the claw lever 143 and the coil spring 146 etc. are located at a place corresponding to the rectangular hole 150 as illustrated by FIG. 6, so as not to hinder the movement of the diaphragm spring 12. The retainer 14 is installed on the sleeve 20 in such a manner that it can slide freely in its axial direction while being urged toward left side of figure by the coil spring 66.

Function will described hereunder. In FIG. 6, the spring force of the diaphragm spring 12 pushes the retainer 14 in the direction of arrow A under the clutch engaging state as illustrated by solid lines, and this spring force transmits to the pressure plate 18 in the direction of arrow A to press on the clutch discs 26 and 27 (FIG. 10) while being multiplied by the lever 16.

In the clutch releasing state where the release lever 24 (FIG. 10) is moved through the release bearing 22 to pull the sleeve 20 in the direction opposite to the arrow A, the retainer 14 is moved in the direction opposite to A. The lever 16 inclines to a position shown by a symbol 16c of the figure. In this instance, the sensing pin 145 only slides in the groove 163 within the range of the play δ, and there is no chance for the sensing pin 145 to swing around the pin 142. Accordingly, the clutch engaging/releasing operations are carried out in the same manner as ordinary operation when the facings F have not been worn out yet.

After the facings F have been worn out, the lever 16 moves by the amount of wear up to a position of broken lines shown by a symbol 16b of FIG. 6 in the direction of arrow A. Under this worn out state, the adjusting ring 11 is also required to move in the direction of arrow A, and the position of the adjuster ring 11 is automatically adjusted by the self adjuster 140 as described below.

Assuming that the wear amount of the facings F is α, the retainer 14 will finally move in the direction of arrow A by about a distance α so that a pulling distance of the retainer 14 in the releasing state will become about a value given by the following equation.

$$\delta + \alpha \quad (1)$$

Figure 8:
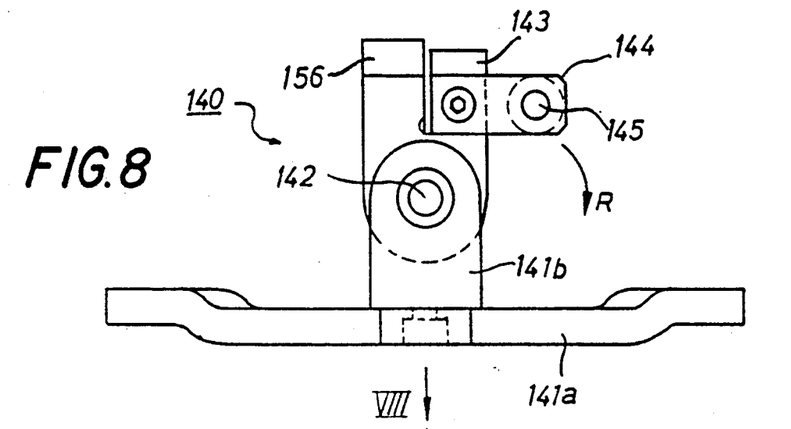
FIG. 8 is a view viewed in a direction of arrow VIII of FIG. 7.

In this instance, the sensing pin 145 swings by an angle corresponding to the distance α in the direction of arrow R of FIG. 8 to cause the claw lever 143 to swing around the pin 142. When the distance α increases and claw 156 of the claw lever 143 reaches a position corresponding to one notch of the ratchet internal tooth 155 of the adjusting ring 11 some time later, the claw 156 pushes the ratchet internal tooth 155 in a direction of arrow B of FIG. 7 to cause the adjusting ring 11 to rotate. The rotation of the adjusting ring 11 causes the ring itself to move in the direction of arrow A by means of the screw pitch of the threaded part 10a.

Consequently, the adjusting ring 11 moves in the direction of arrow A so that its position is adjusted automatically by repeating the clutch engaging/releasing operations until relative positions between the adjusting ring 11, the lever 16 and the pressure plate 18 etc. are restored to initial positions where the facings F are not worn out.

When the clutch is engaged, the sensing pin 145 is rotated by the groove 163 in the direction opposite to the arrow R and the claw 156 of the claw lever 143 also returns in the direction opposite to the arrow B. The claw 156 swings so as to pass over the tooth surface of the ratchet internal tooth 155, and the entire claw lever 143 moves in the radial inside of clutch against a spring force of the coil spring 146.

As described above, the self adjuster for so-called pull-type clutch includes the pressing force transmission lever 16 the inner peripheral end of which is in contact with the retainer 14 connected to the release bearing 22, and the approximately annular adjusting ring 11 for adjusting a clearance produced by a wear of facing, which is in contact with the radial outside end of the lever 16 and screwed into the inner peripheral surface of the clutch cover 10. The sensing pin 145 can be guided around the pin 142 by the retainer 14 which is moved in the axial direction by means of clutch engaging/releasing operations when the facings are worn out, and the claw lever 143 is swung around the pin 142 so that the ratchet internal tooth 155 can be rotated by the claw 156 in the direction of arrow B. Accordingly, the position of the adjusting ring 11 can be adjusted automatically by the amount of wear of the facings F in the direction of arrow A.

The ratchet internal tooth 155 of the claw lever 143 is made mate with the claw 156 of the adjusting ring 11 so that the swinging motion of the claw lever 143 in the direction of arrow R (FIG. 8) enables the adjusting ring 11 to rotate in the direction of B (FIG. 7), the claw lever 143 can be swung against the spring force of the coil spring 146 so that the claw 156 passes over the tooth surface of the ratchet internal tooth 155 at the time of clutch engagement wherein the claw lever 143 swings in the direction opposite to arrow R. Therefore, the automatic adjusting motion becomes positive and smooth as compared with the conventional self adjuster which carries out the automatic adjustment by using the friction force generated by the spring force of spring member.

Incidentally, the self adjuster 140 is not limited to the above case where it is installed on only one spot in the entire clutch, but may be installed on plural spots.

What is claimed is:

1. In a pull-type clutch wherein a release bearing is pulled away from a flywheel for releasing a clutch by a release lever connected to a clutch pedal; a self adjuster for said pull-type clutch including a pressing force transmission lever having an inner peripheral end in contact with a retainer connected to said release bearing, a substantially annular adjusting ring for adjusting clearances resulting from wear of clutch facings of said clutch, said adjusting ring being in contact with a radial outside end of said lever and screwed into an inner peripheral surface of a clutch cover, a stay bracket secured to said clutch cover, said stay bracket having two bearing pieces extending to an inner peripheral surface of said adjusting ring with a pre-set distance, in a clutch circumferential direction therebetween, a pin fitting in said bearing pieces, a worm wheel, having a worm screw on its outer peripheral surface, fitted rotatably onto said pin near one of said bearing pieces, external ratchet teeth, for rotation in only one direction, formed on an end face of said worm wheel and fronting toward one of said bearing pieces, a stopper secured to one of said bearing pieces and mating with said external ratchet teeth for preventing said worm wheel from rotating in said one direction, an arm rotor fitted rotatably onto said pin, said arm rotor having an arm at an end of said arm rotor opposite to said external ratchet teeth of said worm wheel and extending to a radial outside of said pin, said arm of said arm rotor being fitted in a recessed part on an outer peripheral surface of said retainer, ratchet mating parts formed on a pressing end face of said arm rotor and formed on a pressing end face of said worm wheel, said ratchet mating parts mating with each other in a rotating direction of said external ratchet teeth and slide relative to each other in a direction opposite said rotating direction, a spring member urging said arm rotor into engagement with said worm wheel, a play mechanism in said recessed part of said retainer for play in the swing of said arm rotor with movement of said retainer, and a rack formed on an inner peripheral surface of said adjusting ring and mating with said worm screw for rotating said adjusting ring.

2. In a pull-type clutch a release bearing is pulled away from a flywheel for releasing a clutch by a release lever connected to a clutch pedal; a self adjuster for said pull-type clutch including a pressing force transmission lever having an inner peripheral end in contact with a retainer connected to said release bearing, a substantially annular adjusting ring for adjusting clearances from wear of clutch facings of said clutch, said adjusting ring being in contact with a radial outside end of said lever and screwed into an inner peripheral surface of a clutch cover, an opening formed on a part of said clutch cover at a place near an inner peripheral surface of said adjusting ring, a stay bracket secured to said clutch cover and having a bearing piece extending in a clutch axial direction from said opening through a diaphragm spring to a vicinity of an inside surface of said adjusting ring, a pin extending in a clutch radial direction and fitted in said bearing piece, a claw lever swingable around said pin and having a claw at its tip end, a spring member interposed between said claw lever and a large diameter portion formed on a clutch circumferential inside of said pin and urging said claw lever toward a clutch radial outside while allowing said claw lever to move toward a clutch radial inside, said claw lever being formed so that said claw of said claw lever mates with a ratchet tooth surface on said inside surface of said adjusting ring, a sensing arm extending in a clutch circumferential direction and connected to said claw lever, a sensing pin on said sensing arm extending radially inwardly of said clutch, said sensing pin having a tip end fitted in a groove formed on an outer peripheral part of said retainer with a pre-set axial play between said tip end and said retainer for permitting said sensing pin to swing in and around said pin.

* * * * *